(12) United States Patent
Ancona et al.

(10) Patent No.: US 8,931,074 B2
(45) Date of Patent: Jan. 6, 2015

(54) ADAPTIVE SYSTEM BEHAVIOR CHANGE ON MALWARE TRIGGER

(71) Applicant: Dell Products L.P., Round Rock, TX (US)

(72) Inventors: Rocco Ancona, Austin, TX (US); Roy Stedman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/648,583

(22) Filed: Oct. 10, 2012

(65) Prior Publication Data

US 2014/0101748 A1    Apr. 10, 2014

(51) Int. Cl.
*G06F 21/20* (2006.01)

(52) U.S. Cl.
USPC .............................................. 726/12; 726/23

(58) Field of Classification Search
CPC . H04L 63/0281; H04L 63/0428; H04L 63/08; H04L 63/029; H04L 63/083
USPC ............................................... 726/12, 27, 23
See application file for complete search history.

(56) References Cited

U.S. PATENT DOCUMENTS

| | | | |
|---|---|---|---|
| 5,299,519 A * | 4/1994 | Hirabayashi | 112/456 |
| 5,895,462 A * | 4/1999 | Toki | 379/93.25 |
| 6,550,007 B1 * | 4/2003 | Baxter et al. | 713/2 |
| 7,343,488 B2 * | 3/2008 | Yadav | 713/165 |
| 2002/0138760 A1 * | 9/2002 | Naitoh | 713/201 |
| 2003/0101381 A1 * | 5/2003 | Mateev et al. | 714/38 |
| 2003/0151873 A1 * | 8/2003 | Asada | 361/115 |
| 2003/0204632 A1 * | 10/2003 | Willebeek-LeMair et al. | 709/249 |
| 2006/0095965 A1 * | 5/2006 | Phillips et al. | 726/22 |
| 2006/0156405 A1 * | 7/2006 | Forman et al. | 726/24 |
| 2006/0259815 A1 * | 11/2006 | Graham et al. | 714/11 |
| 2006/0259967 A1 * | 11/2006 | Thomas et al. | 726/22 |
| 2007/0240222 A1 * | 10/2007 | Tuvell et al. | 726/24 |
| 2008/0301796 A1 * | 12/2008 | Holostov et al. | 726/12 |
| 2009/0287653 A1 * | 11/2009 | Bennett | 707/3 |
| 2010/0228852 A1 * | 9/2010 | Gemelos et al. | 709/224 |
| 2010/0325632 A1 * | 12/2010 | Guccione et al. | 718/102 |
| 2011/0214186 A1 * | 9/2011 | Khilnani et al. | 726/24 |
| 2012/0096555 A1 * | 4/2012 | Mahaffey | 726/24 |
| 2012/0278882 A1 * | 11/2012 | Lydon et al. | 726/17 |

* cited by examiner

*Primary Examiner* — Jason K. Gee
*Assistant Examiner* — Sanchit Sarker
(74) *Attorney, Agent, or Firm* — Terrile, Cannatti, Chambers & Holland, LLP; Stephen A. Terrile

(57) ABSTRACT

A hardware secured flag mechanism which is activated by trusted Anti-Malware (AM) software. Upon being activated, the information handling system takes action to reduce user exposure even if the AM software is subsequently subverted. In certain embodiments, the flag mechanism is only reset by user intervention at a BIOS or other off-line mechanism. In certain embodiments, the flag mechanism may only be reset via a signed unlock key stored on an external memory device such as a universal serial bus (USB) key.

16 Claims, 4 Drawing Sheets

ADAPTIVE SYSTEM BEHAVIOR CHANGE ON MALWARE TRIGGER

BACKGROUND OF THE INVENTION

1. Field of the Invention

The present invention relates to information handling systems and more particularly to an adaptive system behavior change on a malware trigger.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One important issue for information handling systems relates to protecting the information handling system from malicious software (also referred to as malware). Malware generally refers to any type of hostile, intrusive, or annoying software. Malware is software used or created to disrupt operation of the information handling system, gather sensitive information, or gain access to private information handling systems. Malware can appear in the form of code, scripts, active content, and other software. The complexity and dynamics of a malware and anti-malware ecosystem can often cause users to be deceived into performing sensitive tasks when the information handling system is not secure. In addition, malware can also subvert devices such as cameras and microphones into operation unobtrusively to the user and at undesired times. With some malware type infections, a user may only be presented with warnings for a brief interval before the I/O subsystem (such as a display subsystem) is subverted and made to appear as if all is well.

One attempt to address this issue is via System Health Agents (SHA). SHAs can refuse to complete connections and take other tasks based on an assessment of the systems security. However, often SHAs are limited to software effects or upstream signaling. Additionally, enterprise virus or malware scanners can provide an ability to notify administrators and others on scan failures.

SUMMARY OF THE INVENTION

In accordance with the present invention, a hardware secured flag mechanism is set forth which is activated by trusted Anti-Malware (AM) software. Upon being activated, the information handling system takes action to reduce user exposure even if the AM software is subsequently subverted. In certain embodiments, the flag mechanism is only reset by user intervention at a BIOS or other off-line mechanism. In certain embodiments, the flag mechanism may only be reset via a signed unlock key stored on an external memory device such as a universal serial bus (USB) key.

In certain embodiments, when the hardware secured flag mechanism is activated, the information handling system performs at least one of a plurality of malware protection actions. These actions can include displaying a hardware-generated warning message (such as via warning light such as a light emitting diode (LED), backlight, etc); shutting down any I/O devices such as cameras and microphones; notifying upstream and peer-to-peer devices of the flag so upstream ports could be shut off at the router and other network devices can take appropriate action (such as raising firewall status, disconnecting, etc); blocking network communications (such as Hypertext Transfer Protocol Secure (HTTPS) traffic at the network interface by, for example, performing DNS-redirect operation to display warnings to the user); closing all network ports and dropping all connections but for approved connections (such as a port 80 connection); immediately rebooting into a read-only recovery operating system (OS) (such as a BIOS, alternate partition or cloud-based cleaning OS). The actions can also include optionally blocking or spoofing geo-location data; blocking access to encryption keys (such as Trusted Platform Module (TPM) keys, Wired Equivalent Privacy (WEP) keys and other encryption keys); blocking access to USB ports (e.g., to disable write or read/write operations); communicating the setting of the flag to an administrator (e.g., via Short Message Service (SMS) or Instant Message (IM) type communications via WWAN hardware); and, blocking payment transactions such as Near Field Communication (NFC) type payment transactions The actions can also include optionally saving a current system state to non-volatile memory before performing any of the other actions.

More specifically, in certain embodiments, the invention relates to a method for reducing exposure to malware within an information handling system. The method includes: detecting, via a malware protection application, whether malware is attempting to access the information handling system; providing a malware flag indication to a hardware secured flag mechanism upon the malware protection application detecting an attempt to access the information handling system; and, performing, via the hardware secured flag mechanism, a malware protection operation on the information handling system.

In other embodiments, the invention relates to an information handling system comprising a processor, a hardware secured flag mechanism and, memory coupled to the processor. The memory stores a system for reducing exposure to malware within an information handling system, the system comprising instructions executable by the processor for: detecting, via a malware protection application, whether malware is attempting to access the information handling system; providing a malware flag indication to the hardware secured flag mechanism upon the malware protection application detecting an attempt to access the information handling system; and, performing, via the hardware secured flag mechanism, a malware protection operation on the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
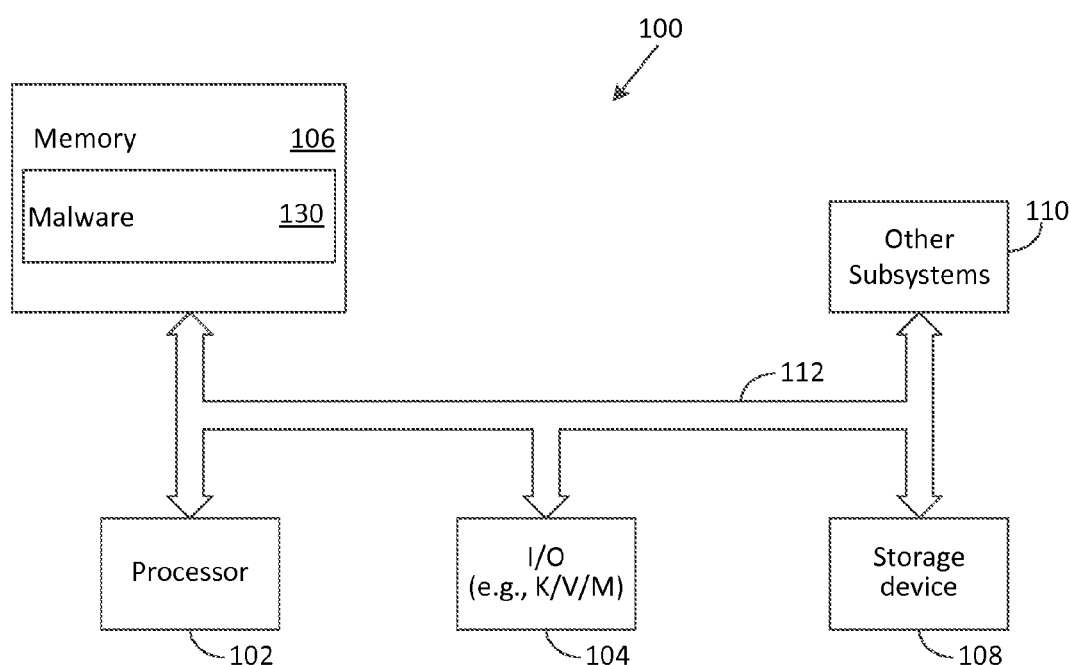
FIG. 1 shows a system block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, and associated controllers (each of which may be coupled remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112.

The memory stores malware protection software 130 which communicates with a hardware secured flag mechanism 132, contained for example, within the other subsystems 110. In certain embodiments, the hardware secured flag mechanism 132 may be stored within firmware of the information handling system such as the basic input output (BIOS) of the information handling system.

The hardware secured flag mechanism is activated by the malware protection software 130 such as trusted Anti-Malware software. Upon being activated, the information handling system 100 takes action to reduce user exposure even if the Anti-Malware software is subsequently subverted. In certain embodiments, the hardware secured flag mechanism 132 is only reset by user intervention at a BIOS or other off-line mechanism. In certain embodiments, the hardware secured flag mechanism 132 may only be reset via a signed unlock key stored on an external memory device such as a universal serial bus (USB) key. The combination of the malware protection software 130 and the hardware secured flag mechanism 132 provides the information handling system with a hardware secured malware protected architecture.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
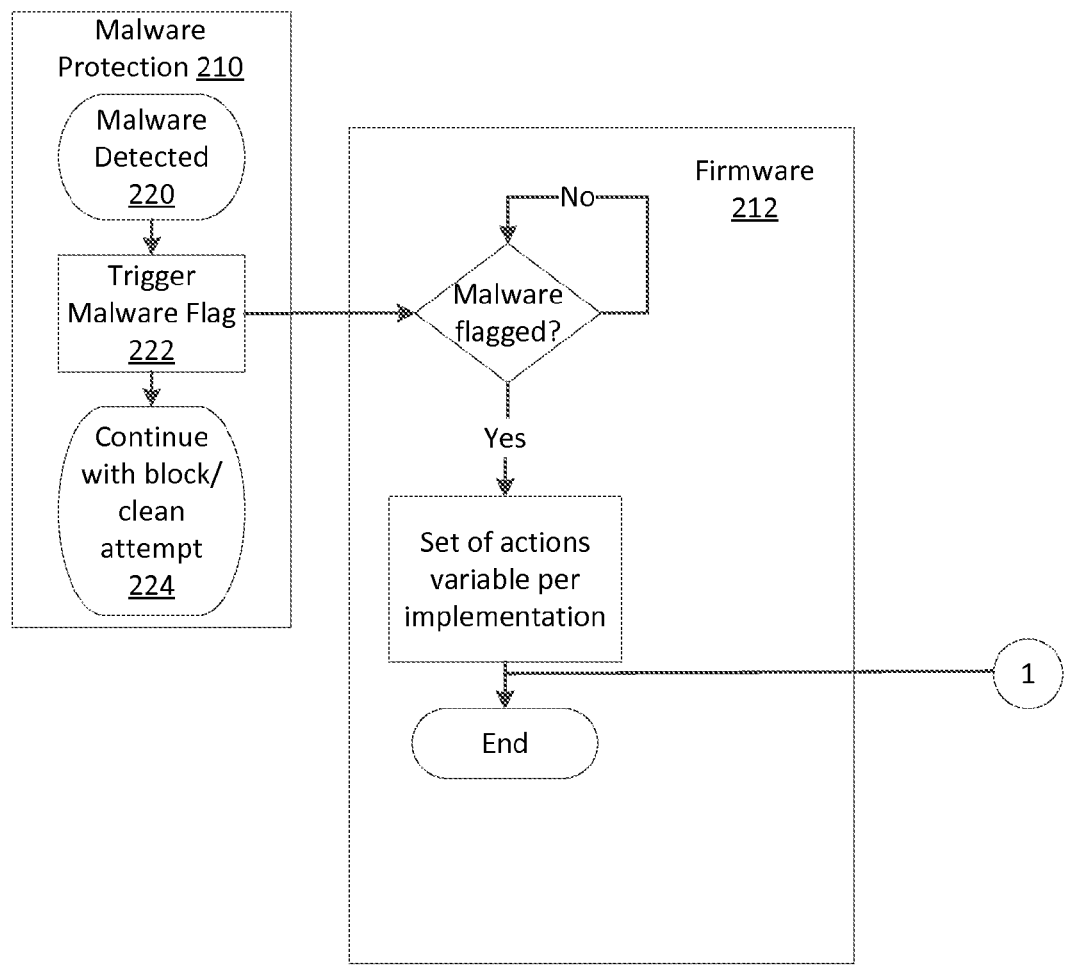
FIG. 2 shows a flow chart of the operation of a hardware secured malware protection architecture.

Referring to FIG. 2, a flow chart of the operation of a hardware secured malware protection architecture 200 is shown. More specifically, the hardware secured malware protection architecture 200 includes a malware protection portion 210 and a firmware portion 212. In various embodiments, the malware protection portion 210 includes malware protection software such as anti-virus software. In various embodiments, the firmware portion 212 includes BIOS firmware.

In operation, within the malware protection portion 210, if malware is detected at step 220, then the malware protection portion activates (i.e., triggers) a malware flag at step 222 and continues operation with an attempt to block and/or clean the detected malware at step 224.

The flag that is activated at step 220 is also provided to the firmware portion 212. More specifically, the firmware portion 220 monitors whether a malware flag has been activated at step 240. If a malware flag is activated then the firmware performs at least one of a plurality of malware protection actions at step 242. These actions can include displaying a hardware-generated warning message (such as via warning light such as a light emitting diode (LED), backlight, etc); shutting down any I/O devices such as cameras and microphones; notifying upstream and peer-to-peer devices of the flag so upstream ports could be shut off at the router and other network devices can take appropriate action (such as raising firewall status, disconnecting, etc); blocking network communications (such as Hypertext Transfer Protocol Secure (HTTPS) traffic at the network interface by, for example, performing DNS-redirect operation to display warnings to the user); closing all network ports and dropping all connections but for approved connections (such as a port 80 connection). The actions can also include optionally protecting (e.g., by blocking or spoofing) geo-location data; blocking access to encryption keys (such as Trusted Platform Module (TPM) keys, Wired Equivalent Privacy (WEP) keys and other encryption keys); blocking access to USB ports (e.g., to disable write or read/write operations); communicating the setting of the flag to an administrator (e.g., via Short Message Service (SMS) or Instant Message (IM) type communications via WWAN hardware); and, blocking payment transactions such as Near Field Communication (NFC) type payment transactions The actions can also include optionally saving a current system state to nonvolatile memory before performing any of the other actions. These actions can also include sending a flag packet to an upstream gateway.

Figure 3:
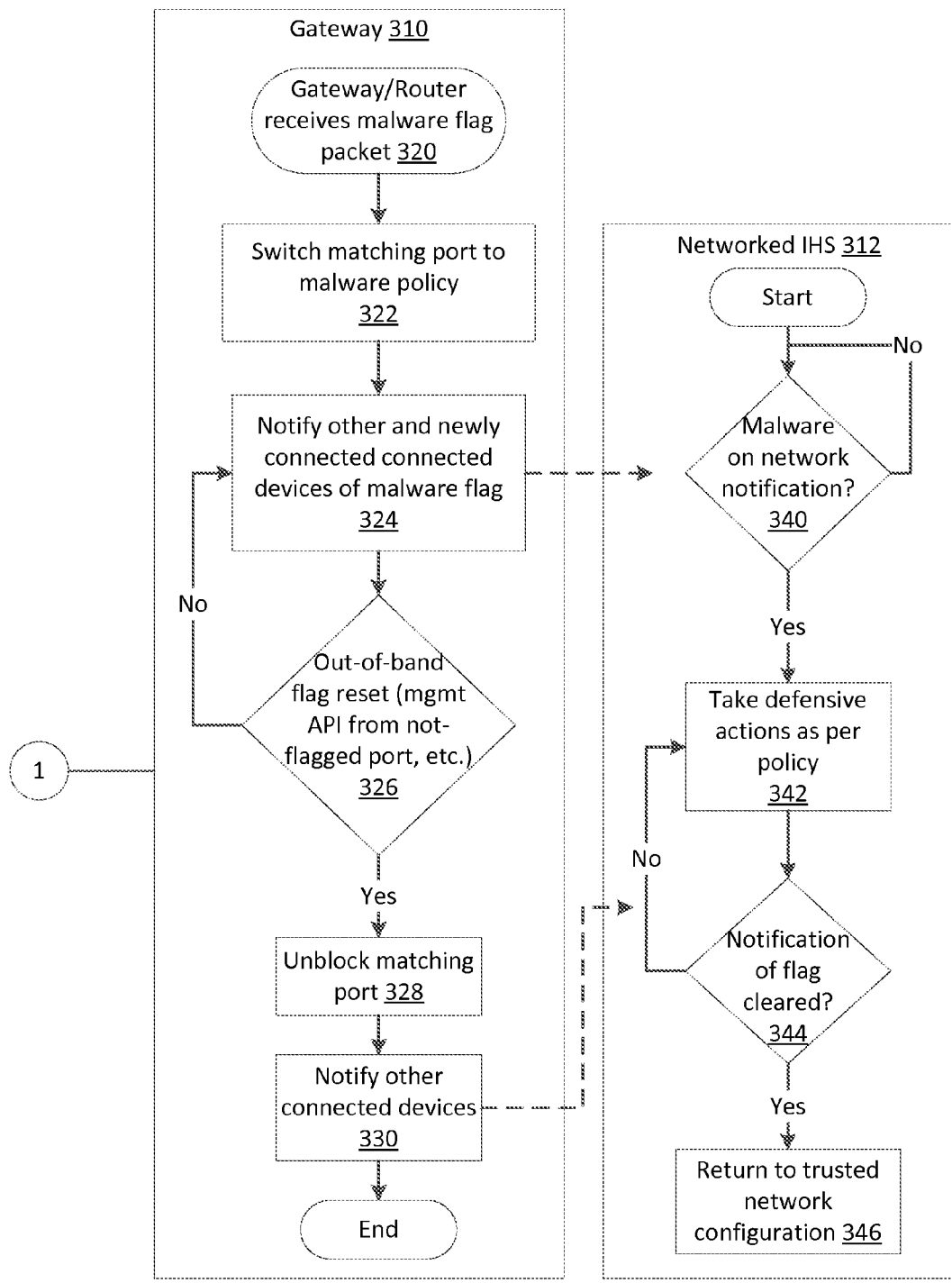
FIG. 3 shows a flow chart of the operation of a hardware secured malware protection architecture.

Referring to FIG. 3, a flow chart of the operation of a hardware secured malware protection architecture 300 is shown. More specifically, when one of the actions that performed by the firmware include sending a flag packet to an upstream gateway, then in addition to the malware protection portion 210 and the firmware portion 212, the hardware secured malware protection architecture 300 further includes a gateway portion 310 and a networked information handling system portion 312. In various embodiments, the gateway portion 310 includes software for interfacing with a network gateway. In various embodiments, the networked information handling system portion 312 includes an information handling system such as the information handling system 100.

In operation, a gateway or router within the gateway portion 310 receives a malware flag packet at step 320. Next, the gateway portion 310 switches a port which corresponds to the information handling system which generated the flag to a malware policy at step 322. The malware policy may perform at least one of a plurality of functions including shutting off the system that generated the flag, closing connections with the system that generated the flag, blocking ports of the system that generated the flag from transmitting through the gateway and/or raising a firewall between the gateway portion 310 and the system that generated the flag. Next, at step 324, the gateway portion 310 notifies any other systems which are coupled to the gateway portion of the malware flag Next, at step 326, the gateway portion 310 determines whether any out of band malware flags have been reset. For example, in certain embodiments, the out of band flags may be reset based upon a management application program interface from a non flagged port. Based upon receiving an indication of whether any out of band malware flags have been reset, the gateway portion 310 unblocks the matching portion within the system that generated the flag at step 328 and notifies other devices which are coupled to the network at step 330. By providing out of band malware flags, an additional level of protection is provided to the network in which the information handling system resides. More specifically, by allowing the malware flags to be reset out of band (e.g., via some form of side band), any attempts by malware to corrupt the gateway (e.g., by spoofing the gateway) are also avoided.

When the gateway portion 324 notifies other systems which are coupled to the gateway portion (e.g., other networked information handling systems), the networked information handling system portion 312 determines that a malware on network notification has been set at step 340. The network information handling system portion 312 then takes defensive actions pursuant to a resident malware policy at step 342. These defensive actions can include at least one of raising a firewall, suspending communication with the system which generated the malware flag, and notifying users of the malware flag.

Next, the networked information handling system portion 312 determines whether the malware flag is cleared at step 344. The malware flag may be cleared by the original system that generated the malware flag or by the notification provided by the gateway portion 310 at step 330. When the malware flag is cleared, then the networked information handling system 312 returns to operating in a trusted network configuration at step 346.

Figure 4:
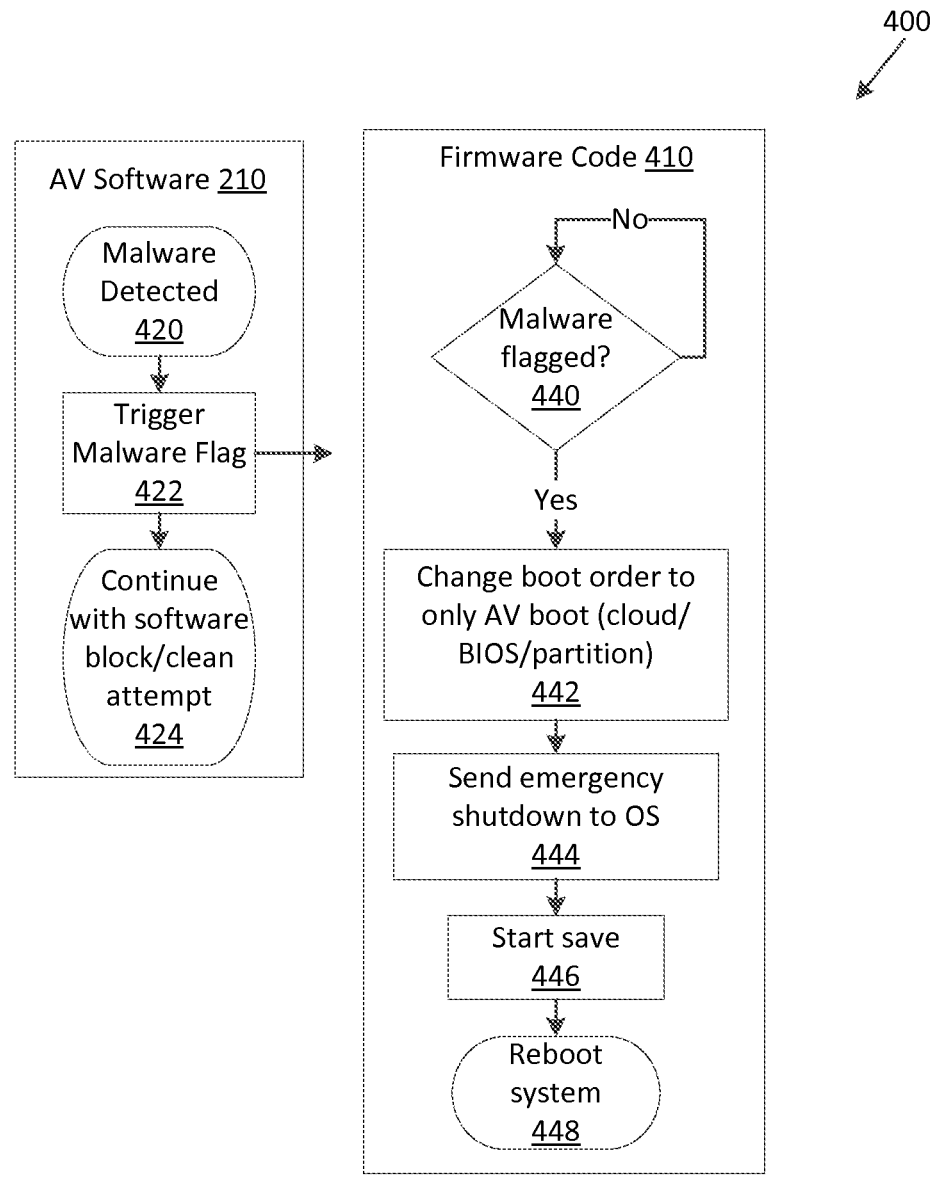
FIG. 4 shows a flow chart of the operation of the operation of a hardware secured malware protection architecture.

Referring to FIG. 4, a flow chart of the operation of a hardware secured malware protection architecture 400 is shown. More specifically, the hardware secured malware protection architecture 400 includes a malware protection portion 210 and a firmware portion 410. In various embodiments, the firmware portion 212 includes BIOS firmware.

In operation, within the malware protection portion 210, if malware is detected at step 420, then the malware protection portion activates (i.e., triggers) a malware flag at step 422 and continues operation with an attempt to block and/or clean the detected malware at step 424.

The flag that is activated at step 420 is also provided to the firmware portion 410. More specifically, the firmware portion 410 monitors whether a malware flag has been activated at step 440. If a malware flag is activated then the firmware changes the boot order of the information handling system which generated the malware flag to an anti malware boot order at step 442. The anti malware boot order can include at least one of booting the information handling system from known safe operating system such as a read-only recovery operating system (such as a BIOS operating system), an operating system stored within an alternate partition or a cloud-based cleaning OS. Next the firmware generates an emergency shutdown message to the operating system at step 444 and and triggers a current system state file save at step 446. The firmware then reboots the information handling system which generated the malware flag at step 448.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for reducing exposure to malware within an information handling system comprising:

detecting, via a malware protection application, whether malware is attempting to access the information handling system;

providing a malware flag indication to a hardware secured flag mechanism upon the malware protection application detecting an attempt to access the information handling system; and, performing, via the hardware secured flag mechanism, a malware protection operation on the information handling system, the malware protection operation comprising blocking access to input/output ports of the information handling system but for an approved port connection, the approved port connection comprising a port 80 connection; and wherein, the malware protection operation comprises providing the malware flag indication to a gateway portion via a malware flag packet; and, the gateway portion blocks ports of the information handling system that generated the flag from transmitting through the gateway.

2. The method of claim 1 wherein:

the flag mechanism is only reset by user intervention.

3. The method of claim 1 wherein:

the flag mechanism is only be reset via a signed unlock key stored on an external memory device.

4. The method of claim 1 wherein:

the malware protection operation comprises at least one of displaying a hardware-generated warning message; shutting down any I/O devices of the information handling system; notifying upstream and peer-to-peer devices of the flag;

blocking network communications at the network interface; closing all network ports and dropping all connections but for approved connections.

5. The method of claim 1 wherein:

the malware protection operation further comprises at least one of protecting geo-location data; blocking access to encryption keys; communicating detection of the flag to an administrator; and, blocking payment transactions from being performed by the information handling system.

6. The method of claim 1 wherein:

the malware protection operation comprises immediately rebooting into a recovery operating system (OS).

7. The method of claim 6 further comprising:

saving a current system state to non-volatile memory before performing the rebooting.

8. The method of claim 1 wherein:

the gateway portion further performs at least one of shutting off the information handling system that generated the flag, closing connections with the information handling system that generated the flag, and raising a firewall between the gateway portion and the information handling system that generated the flag.

9. An information handling system comprising:

a processor;

a hardware secured flag mechanism; and, memory coupled to the processor, the memory storing a system module for reducing exposure to malware within an information handling system, the module comprising instructions executable by the processor for:

detecting, via a malware protection application, whether malware is attempting to access the information handling system;

providing a malware flag indication to the hardware secured flag mechanism upon the malware protection application detecting an attempt to access the information handling system; and, performing, via the hardware secured flag mechanism, a malware protection operation on the information handling system, the malware protection operation comprising blocking access to input/output ports of the information handling system but for an approved port connection, the approved port connection comprising a port 80 connection; and wherein, the malware protection operation comprises providing the malware flag indication to a gateway portion via a malware flag packet; and, the gateway portion blocks ports of the information handling system that generated the flag from transmitting through the gateway.

10. The information handling system of claim 9 wherein:

the flag mechanism is only reset by user intervention.

11. The information handling system of claim 9 wherein:

the flag mechanism is only be reset via a signed unlock key stored on an external memory device.

12. The information handling system of claim 9 wherein:

the malware protection operation comprises at least one of displaying a hardware-generated warning message; shutting down any I/O devices of the information handling system; notifying upstream and peer-to-peer devices of the flag;

blocking network communications at the network interface; closing all network ports and dropping all connections but for approved connections.

13. The information handling system of claim 9 wherein:

the malware protection operation further comprises at least one of protecting geo-location data; blocking access to encryption keys; communicating detection of the flag to an administrator; and, blocking payment transactions from being performed by the information handling system.

14. The information handling system of claim 9 wherein:

the malware protection operation comprises immediately rebooting into a recovery operating system (OS).

15. The information handling system of claim 14 further comprising:

saving a current system state to non-volatile memory before performing the rebooting.

16. The information handling system of claim 9 wherein:

the gateway portion further performs at least one of shutting off the information handling system that generated the flag, closing connections with the information handling system that generated the flag, and raising a firewall between the gateway portion and the information handling system that generated the flag.

* * * * *